US011674070B1

(12) United States Patent
Musso et al.

(10) Patent No.: US 11,674,070 B1
(45) Date of Patent: Jun. 13, 2023

(54) UNFOLDABLE DEVICE FOR CONTROLLING LOSS CIRCULATION

(71) Applicant: Saudi Arabian Oil Company, Dhahran (SA)

(72) Inventors: Simone Musso, Houston, TX (US); Ashok Santra, The Woodlands, TX (US); Sivaprakash Shanmugam, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/959,542

(22) Filed: Oct. 4, 2022

Related U.S. Application Data

(62) Division of application No. 16/876,186, filed on May 18, 2020, now Pat. No. 11,492,530.

(60) Provisional application No. 62/848,664, filed on May 16, 2019.

(51) Int. Cl.
  *C09K 8/035* (2006.01)
  *E21B 21/00* (2006.01)
  *E21B 33/138* (2006.01)

(52) U.S. Cl.
  CPC ............ *C09K 8/035* (2013.01); *E21B 21/003* (2013.01); *E21B 33/138* (2013.01)

(58) Field of Classification Search
  None
  See application file for complete search history.

(56) References Cited

U.S. PATENT DOCUMENTS

| 3,417,824 A | 12/1968 | Poollen |
| 3,726,340 A | 4/1973 | Fraser |
| 4,704,213 A | 11/1987 | Delhommer et al. |
| 7,279,445 B2 | 10/2007 | Schlemmer |
| (Continued) | | |

FOREIGN PATENT DOCUMENTS

| CN | 101484659 A | 7/2009 |
| CN | 109517588 A | 3/2019 |
| WO | 2006007347 A2 | 1/2006 |

OTHER PUBLICATIONS

Erlandsson, Johan et al.; "Cross-Linked and Shapeable Porous 3D Substrates from Freeze-Linked Cellulose Nanofibrils" Biomacromolecules, vol. 20(2), Feb. 11, 2019; pp. 728-737.
(Continued)

*Primary Examiner* — Charles R Nold
(74) *Attorney, Agent, or Firm* — Bracewell LLP; Constance G. Rhebergen; Brian H. Tompkins

(57) ABSTRACT

Embodiments of the disclosure provide an unfoldable device for controlling lost circulation in a target lost circulation zone in a borehole. The unfoldable device includes a sheet, a backbone, and a shell. The sheet has an unfolded state and a folded state. The backbone reinforces the sheet. The backbone includes a shape-memory material having an original state and a deformed state. The shell encapsulates the sheet in the folded state and the backbone in the deformed state. In some embodiments, the shell includes a degradable polymer that degrades in the borehole upon contact with a drilling fluid such that the sheet transitions to the unfolded state and the backbone transitions to the original state. The sheet in the unfolded state accumulates on a borehole wall at least partially covering an entrance to a macrochannel of the target lost circulation zone.

21 Claims, 3 Drawing Sheets

(56) References Cited

U.S. PATENT DOCUMENTS

| | | | |
|---|---|---|---|
| 7,284,611 B2 | 10/2007 | Reddy et al. | |
| 7,647,964 B2 | 1/2010 | Akbar et al. | |
| 8,088,717 B2 | 1/2012 | Polizzotti et al. | |
| 8,307,916 B1 | 11/2012 | Wald | |
| 8,381,813 B2 | 2/2013 | Diaz et al. | |
| 9,200,190 B2 | 12/2015 | Maxey et al. | |
| 9,499,719 B2 | 11/2016 | Cadix et al. | |
| 2010/0236794 A1* | 9/2010 | Duan | E21B 33/127 166/387 |
| 2013/0045530 A1* | 2/2013 | Gracias | B81C 1/00007 428/57 |
| 2016/0032169 A1 | 2/2016 | Chew et al. | |
| 2016/0160106 A1* | 6/2016 | Jamison | C09K 8/035 507/112 |
| 2019/0016941 A1 | 1/2019 | Contreras | |

OTHER PUBLICATIONS

Fernandes, Rohan et al.; "Self-folding polymeric containers for encapsulation and delivery of drugs" Advanced Drug Delivery Reviews 64, 2012; pp. 1579-1589.

International Search Report and Written Opinion for International Application No. PCT/US2020/032992, report dated Sep. 1, 2020; pp. 1-16.

Kausar, Ayesha et al.; "Effect of graphene nanoplatelet addition on properties of thermo-responsive shape memory polyurethane-based nanocomposite" Fullerness, Nanotubes and Carbon Nanostructures, 2016, vol. 24, No. 4; pp. 235-242.

Peraza-Hernandez, Edwin A. et al.; "Folding patterns and shape optimization using SMA-based self-folding laminates" Proc. of SPIE vol. 9057, Mar. 9, 2014; pp. 90571G-1-90571G-13.

\* cited by examiner

UNFOLDABLE DEVICE FOR CONTROLLING LOSS CIRCULATION

RELATED APPLICATION

This application is a divisional of and claims priority from U.S. Non-provisional application Ser. No. 16/876,186 filed May 18, 2020, and titled "UNFOLDABLE DEVICE FOR CONTROLLING LOSS CIRCULATION, which claims priority from U.S. Provisional Application No. 62/848,664 filed May 16, 2019, and titled "UNFOLDABLE DEVICE FOR CONTROLLING LOSS CIRCULATION," each of which are incorporated by reference in their entirety for purposes of United States patent practice.

BACKGROUND

Field of the Disclosure

Embodiments of the disclosure generally relate to preventing lost circulation. More specifically, embodiments of the disclosure relate to a method and device for preventing severe lost circulation during a drilling event.

Description of the Related Art

Lost circulation is one of the frequent challenges encountered during drilling operations. Lost circulation can be encountered during any stage of operations and occurs when drilling fluid (such as drilling mud) pumped into a well returns partially or does not fully return to the surface. While some fluid loss is expected, excessive fluid loss is not desirable from a safety, an economical, or an environmental point of view. Lost circulation is associated with problems with well control, borehole instability, pipe sticking, unsuccessful production tests, poor hydrocarbon production after well completion, and formation damage due to plugging of pores and pore throats by mud particles. In extreme cases, lost circulation problems may force abandonment of a well.

Lost circulation can occur in various formations, such as naturally fractured formations and cavernous formations, and at formations having less pressure than the wellbore fluid. Lost circulation can be categorized by the amount of fluid or mud lost and may be categorized as seepage loss, moderate loss, severe loss, and total loss. Seepage loss is characterized by a loss of from about 0.16 to about 1.6 cubic meter per hour ($m^3$/hr) (about 1 to about 10 barrels per hour (bbl/hr)) of drilling fluid. Moderate loss is characterized by a loss of from about 1.6 to about 16 $m^3$/hr (about 10 to about 100 bbl/hr). Severe loss is characterized by a loss greater than about 16 $m^3$/hr (about 100 bbl/hr) but lesser than a total loss. Moderate loss, severe loss, and total loss typically require regaining full circulation. The extent of the fluid loss and the ability to control the lost circulation with a lost circulation material (LCM) depends on the type of formation in which the lost circulation occurs. Formations with low permeability zones, that is, those with microscopic cracks and fissures, usually have seepage type lost circulation. Other formations may experience lost circulation if an improper mud weight is used while drilling. As a rule of thumb, when the size of the pore is greater than about three times the size of an average constituent particle of the formation, the drilling fluid may encounter a severe loss or total loss.

SUMMARY

Embodiments of the disclosure generally relate to preventing lost circulation. More specifically, embodiments of the disclosure relate to a method and device for preventing severe lost circulation during a drilling event.

Embodiments of the disclosure provide an unfoldable device for controlling lost circulation in a target lost circulation zone in a borehole. The unfoldable device includes a sheet, a backbone, and a shell. The sheet has an unfolded state and a folded state. The backbone reinforces the sheet. The backbone includes a shape-memory material having an original state corresponding to the unfolded state of the sheet and a deformed state corresponding to the folded state of the sheet. The shell is operable to encapsulate the sheet in the folded state and the backbone in the deformed state such that the unfoldable device is in a compressed state.

In some embodiments, the sheet includes a polymer including thermoplastic elastomers, diene-based polymers, monoolefin-based polymers, ethylene-based polymers, 1-hexene-based polymers, polyurethanes, polyesters, polyethers, fluoropolymers, styrene-butadiene random copolymers, styrene-butadiene block copolymers, styrene-butadiene-styrene block copolymers, hydrogenated styrene-butadiene rubber, and combinations of the same.

In some embodiments, the shell includes a degradable polymer configured to degrade in the borehole upon contact with a drilling fluid such that the sheet transitions to the unfolded state and the backbone transitions to the original state. In some embodiments, the degradable polymer is configured to degrade in the borehole at a temperature greater than 100° F. In some embodiments, the sheet in the unfolded state is configured to accumulate on a borehole wall at least partially covering an entrance to a macrochannel of the target lost circulation zone.

In some embodiments, the unfoldable device in the compressed state has a substantially spherical geometry. In some embodiments, the unfoldable device has a diameter ranging from 1.5 to 3.5 centimeters.

In some embodiments, the unfoldable device in the compressed state has a geometry including ellipsoidal, cylindrical, conical, polyhedral, truncated geometries of the same, and combinations of the same. In some embodiments, the unfoldable device in the compressed state has a major dimension ranging from 1.5 to 3.5 centimeters.

In some embodiments, the shape-memory material includes shape-memory polymers, shape-memory alloys, elastic materials, and combinations of the same. In some embodiments, the shape-memory material includes a viscoelastic polyurethane foam.

Embodiments of the disclosure also provide a method for controlling lost circulation in a target lost circulation zone in a borehole. The method includes the step of introducing an unfoldable device in a compressed state and a drilling fluid into the borehole. The unfoldable device includes a sheet, a backbone, and a shell. The sheet has an unfolded state and a folded state. The backbone reinforces the sheet. The backbone includes a shape-memory material having an original state corresponding to the unfolded state of the sheet and a deformed state corresponding to the folded state of the sheet. The shell encapsulates the sheet in the folded state and the backbone in the deformed state. The shell includes a degradable polymer. The shell degrades in the borehole such that the sheet is released. The sheet transitions to the unfolded state and the backbone transitions to the original state such that the sheet accumulates on a borehole wall at least partially covering an entrance to a macrochannel of the target lost circulation zone.

In some embodiments, the sheet includes a polymer including thermoplastic elastomers, diene-based polymers, monoolefin-based polymers, ethylene-based polymers, 1-hexene-based polymers, polyurethanes, polyesters, polyethers, fluoropolymers, styrene-butadiene random copolymers, styrene-butadiene block copolymers, styrene-butadiene-styrene block copolymers, hydrogenated styrene-butadiene rubber, and combinations of the same.

In some embodiments, the shell degrades at a temperature greater than 100° F.

In some embodiments, the unfoldable device in the compressed state has a substantially spherical geometry. In some embodiments, the unfoldable device in the compressed state has a diameter ranging from 1.5 to 3.5 centimeters.

In some embodiments, the unfoldable device in the compressed state has a geometry including ellipsoidal, cylindrical, conical, polyhedral, truncated geometries of the same, and combinations of the same. In some embodiments, the unfoldable device in the compressed state has a major dimension ranging from 1.5 to 3.5 centimeters.

In some embodiments, the shape-memory material includes shape-memory polymers, shape-memory alloys, elastic materials, and combinations of the same. In some embodiments, the shape-memory material includes a viscoelastic polyurethane foam.

In some embodiments, the backbone is attached to the sheet via three-dimensional (3D) printing (or additive manufacturing).

Embodiments of the disclosure also provide an altered drilling fluid for controlling lost circulation in a target lost circulation zone in a borehole. The altered drilling fluid includes a drilling fluid and an unfoldable device. The unfoldable device is dispersed in the drilling fluid. The unfoldable device includes a sheet, a backbone, and a shell. The sheet has an unfolded state and a folded state. The backbone reinforces the sheet. The backbone includes a shape-memory material having an original state corresponding to the unfolded state of the sheet and a deformed state corresponding to the folded state of the sheet. The shell is operable to encapsulate the sheet in the folded state and the backbone in the deformed state such that the unfoldable device is in a compressed state.

In some embodiments the sheet includes a polymer including thermoplastic elastomers, diene-based polymers, monoolefin-based polymers, ethylene-based polymers, 1-hexene-based polymers, polyurethanes, polyesters, polyethers, fluoropolymers, styrene-butadiene random copolymers, styrene-butadiene block copolymers, styrene-butadiene-styrene block copolymers, hydrogenated styrene-butadiene rubber, and combinations of the same.

In some embodiments, the shell includes a degradable polymer configured to degrade in the borehole upon contact with a drilling fluid such that the sheet transitions to the unfolded state and the backbone transitions to the original state. In some embodiments, the degradable polymer is configured to degrade in the borehole at a temperature greater than 100° F. In some embodiments, the sheet in the unfolded state is configured to accumulate on a borehole wall at least partially covering an entrance to a macrochannel of the target lost circulation zone.

In some embodiments, the unfoldable device in the compressed state has a substantially spherical geometry. In some embodiments, the unfoldable device in the compressed state has a diameter ranging from 1.5 to 3.5 centimeters.

In some embodiments, the unfoldable device in the compressed state has a geometry including ellipsoidal, cylindrical, conical, polyhedral, truncated geometries of the same, and combinations of the same. In some embodiments, the unfoldable device in the compressed state has a major dimension ranging from 1.5 to 3.5 centimeters.

In some embodiments, the shape-memory material includes shape-memory polymers, shape-memory alloys, elastic materials, and combinations of the same. In some embodiments, the shape-memory material includes a viscoelastic polyurethane foam.

BRIEF DESCRIPTION OF THE DRAWINGS

So that the manner in which the previously-recited features, aspects, and advantages of the embodiments of this disclosure as well as others that will become apparent are attained and can be understood in detail, a more particular description of the disclosure briefly summarized previously may be had by reference to the embodiments that are illustrated in the drawings that form a part of this specification. However, it is to be noted that the appended drawings illustrate only certain embodiments of the disclosure and are not to be considered limiting the scope of the disclosure as the disclosure may admit to other equally effective embodiments.

Figure 1:
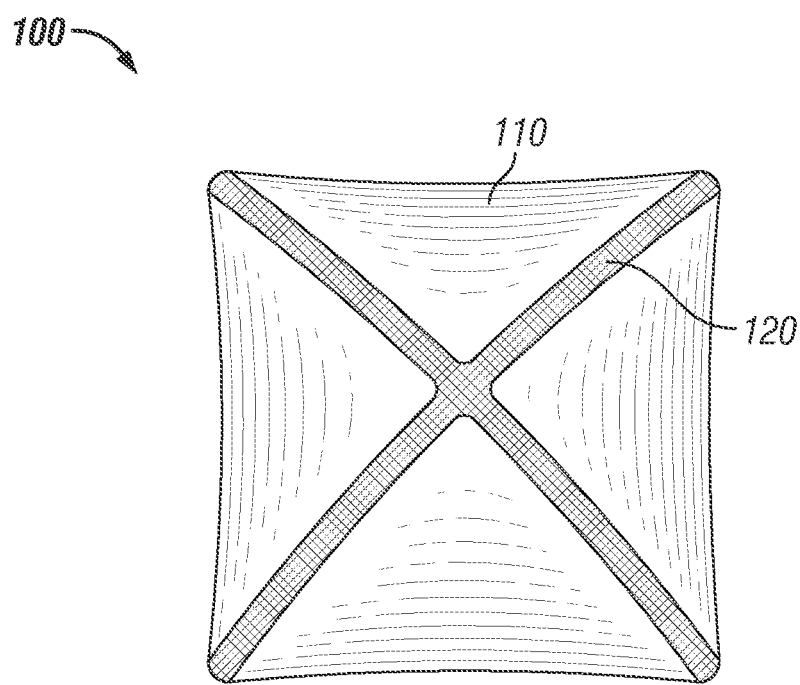
FIG. 1 is a perspective view of an unfoldable device in an unfolded state, according to an embodiment of the disclosure.

In the accompanying Figures, similar components or features, or both, may have a similar reference label.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended claims.

Those of skill in the art also understand that the terminology used for describing particular embodiments does not limit the scope or breadth of the embodiments of the disclosure. In interpreting the specification and appended claims, all terms should be interpreted in the broadest possible manner consistent with the context of each term. All technical and scientific terms used in the specification and appended claims have the same meaning as commonly understood by one of ordinary skill in the art to which this disclosure belongs unless defined otherwise.

Although the disclosure has been described with respect to certain features, it should be understood that the features and embodiments of the features can be combined with other features and embodiments of those features.

Although the disclosure has been described in detail, it should be understood that various changes, substitutions, and alternations can be made without departing from the principle and scope of the disclosure. Accordingly, the scope of the present disclosure should be determined by the following claims and their appropriate legal equivalents.

As used throughout the disclosure, the singular forms "a," "an," and "the" include plural references unless the context clearly indicates otherwise.

As used throughout the disclosure, the word "about" includes +/−5% of the cited magnitude.

As used throughout the disclosure, the words "comprise," "has," "includes," and all other grammatical variations are each intended to have an open, non-limiting meaning that does not exclude additional elements, components or steps. Embodiments of the present disclosure may suitably "comprise," "consist," or "consist essentially of" the limiting features disclosed, and may be practiced in the absence of a limiting feature not disclosed. For example, it can be recognized by those skilled in the art that certain steps can be combined into a single step.

As used throughout the disclosure, the words "optional" or "optionally" means that the subsequently described event or circumstances can or may not occur. The description includes instances where the event or circumstance occurs and instances where it does not occur.

Where a range of values is provided in the specification or in the appended claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended claims to a method comprising two or more defined steps, the defined steps can be carried out in any order or simultaneously except where the context excludes that possibility.

As used throughout the disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

As used throughout the disclosure, spatial terms described the relative position of an object or a group of objects relative to another object or group of objects. The spatial relationships apply along vertical and horizontal axes. Orientation and relational words, including "uphole," "downhole" and other like terms, are for descriptive convenience and are not limiting unless otherwise indicated.

FIG. 1 shows a perspective view of an unfoldable device 100 in an unfolded (or non-compressed) state, according to an embodiment of the disclosure. The unfoldable device 100 includes a sheet 110. As shown in FIG. 1, the sheet 110 is in an unfolded (or non-compressed) state. The sheet 110 has a substantially planar configuration. The sheet 110 includes a flexible material allowing the sheet 110 to transition with ease between the unfolded state and a folded (or compressed) state. The flexible material can include a polymer. Non-limiting example polymer materials used for the flexible material include thermoplastic elastomers, diene-based polymers (including butadiene-based polymers, isoprene-based polymers, and hexadiene-based polymers), monoolefin-based polymers, ethylene-based polymers, 1-hexene-based polymers, polyurethanes, polyesters, polyethers, fluoropolymers, styrene-butadiene random copolymers, styrene-butadiene block copolymers, styrene-butadiene-styrene block copolymers, and hydrogenated styrene-butadiene rubber.

The sheet 110 can have any two dimensional geometry suitable for adhering to a borehole wall and at least partially covering a target lost circulation zone. The sheet 110 is large enough to at least partially cover certain macrochannels that are located in the target lost circulation zone. For example, the sheet 110 can have a two dimensional geometry of a polygon, an ellipse, or a simple closed curve. FIG. 1 shows an example sheet 110 in the unfolded state having a quadrilateral geometry resembling a kite. The length of each side of the quadrilateral can vary between about 1 and about 50 centimeters (cm), alternately between about 1 and about 30 cm, or alternately between about 5 and about 15 cm. As used throughout the disclosure, the term "macrochannel" refers to a pore accountable for a severe loss or total loss located in the target lost circulation zone.

The sheet 110 can have certain thicknesses enabling the sheet 110 to maintain its unfolded state and withstand a hydraulic pressure differential that can be applied to the sheet 110 while the sheet 110 is in contact with the borehole wall at least partially covering a macrochannel that is located in the target lost circulation zone. One skilled in the art would recognize that the thickness requirement depends on various mechanical properties of the material used for the sheet 110. For example, the sheet 110 can have a thickness between about 0.1 micron and about 1 cm, alternately between about 0.5 micron and about 5 millimeters (mm), or alternately between about 1 micron and about 1 mm.

Still referring to FIG. 1, the unfoldable device 100 can include a backbone 120 capable of reinforcing the sheet 110. The backbone 120 can be attached to or molded into the sheet 110. For example, the backbone 120 can be attached to or molded into the sheet 110 via 3D printing. The backbone 120 includes a shape-memory material having an original state and a deformed state. The shape-memory material in the deformed state is capable of transitioning to the original state. Such transition can be triggered by, for example, elastic force, heat, electric force, magnetic force, light, chemical absorption, and swelling of the backbone 120. The transition from the deformed state to the original state enables the sheet 110 to transition from the folded state to the unfolded state. Non-limiting examples of shape-memory material include shape-memory polymers, shape-memory alloys, and elastic materials. Shape-memory polymers include viscoelastic polyurethane foam, known as memory foam. The viscoelastic polyurethane foam can be 3D printed such that the viscoelastic polyurethane backbone 120 is attached to or molded into the sheet 110.

The backbone 120 can reinforce the sheet 110 in a variety of geometries. The backbone can be positioned on the planar area or on the edges of the sheet 110. FIG. 1 shows an example backbone 120 in the original state having a cross-type geometry located on or molded into the planar area of the sheet 110 resembling a kite or an umbrella. The shape-memory material used for the backbone 120 in the original state is resilient enough to maintain the sheet 110 in its unfolded state. The shape-memory material used for the backbone 120 in the original state is resilient enough to support the sheet 110 from withstanding hydraulic pressure differential that can be applied to the sheet 110 while the sheet 110 is in contact with the borehole wall at least partially covering a macrochannel that is located in the target lost circulation zone. One skilled in the art would recognize that the resiliency requirement depends on various mechanical properties of the material used for the backbone 120. As used throughout the disclosure, resiliency refers to the ability of a material to undergo stress, deform, and then recover and return to its original shape after the stress ceases.

In some embodiments, the backbone 120 can include abrasive materials on the surface to enhance friction. Non-limiting example abrasive materials include aluminum oxide and titanium oxide particles. The abrasive materials can be 3D printed in conjunction with the viscoelastic polyurethane backbone 120. Alternately, these abrasive materials can be 3D printed on the sheet 110. In some embodiments, the backbone 120 can be 3D printed such that friction-enhancing structures are created on the surface.

In other embodiments, the unfoldable device 100 includes a sheet 110 without a backbone 120. The sheet 110 itself includes a shape-memory material having an unfolded state (corresponding to the original state of the shape-memory material) and a folded (or compressed) state (corresponding to the deformed state of the shape-memory material). The shape-memory material in the deformed state is capable of transitioning to the original state. The transition can be triggered by, for example, elastic force, heat, electric force, magnetic force, light, chemical absorption, and swelling of the sheet 110. Non-limiting examples of shape-memory material include shape-memory polymers, shape-memory alloys, and elastic materials. Shape-memory polymers include viscoelastic polyurethane foam, known as memory foam. The viscoelastic polyurethane sheet 110 can be 3D printed.

Figure 2:
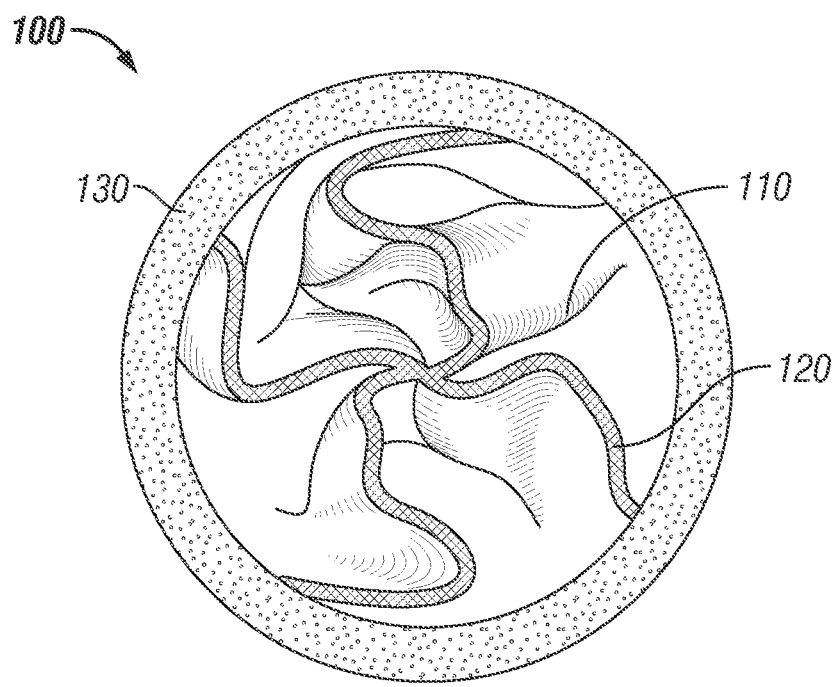
FIG. 2 is a cross-sectional view of the unfoldable device in a folded state, according to an embodiment of the disclosure.

FIG. 2 shows a cross-sectional view of the unfoldable device 100 in a folded (or compressed) state, according to an embodiment of the disclosure. The sheet 110 is in the folded (or compressed) state with the backbone 120 in the deformed state. In other embodiments, the sheet 100 is in the folded (or compressed) state without a backbone 120. The unfoldable device in the folded (or compressed) state 100 includes a shell 130. The shell 130 can include a polymer. The polymer can include a dissolvable or degradable polymer. The shell 130 encapsulates the sheet 110 in the folded (or compressed) state with the backbone 120 in the deformed state. The degradable polymer used for the sheet 130 can be water-soluble, oil-soluble, water-degradable, or oil-degradable. Non-limiting example materials used for the dissolvable or degradable polymer include polylactic acid (PLA), polyglycolic acid (PGA), polyvinyl alcohol (PVA), and polyethylene glycol (PEG). Non-limiting example materials used for the dissolvable or degradable polymer include polyesters (for example, polylactate), polyamides, polyureas, polyurethanes, polyethylene oxide, polyvinyl acetate, polyethylene, polypropylene, polyvinylchloride (PVC), polyvinylidenechloride, ethylene-vinylacetate (EVA) copolymer, poly(ether or ketone), and polyanhydrides. Non-limiting example materials used for the dissolvable or degradable polymer include water soluble polymers. Non-limiting examples of materials used for the dissolvable or degradable polymer include hydroxyethyl cellulose, carboxymethyl cellulose, sodium carboxymethyl hydroxyethyl cellulose, methylhydroxypropyl cellulose, starches, cellulose triesters, and styrene-butadiene based latex. Non-limiting example materials used for the dissolvable or degradable polymer include polymer blends having natural polymers such as starch-based blends, and polymer blends having water soluble polymers such as PLA-based blends. In some embodiments, certain polymers are dissolvable or degradable via hydrolysis. In other embodiments, certain polymers are capable of dissolving or degrading via thermo-oxidation.

In some embodiments, the dissolvable or degradable polymer can at least partially dissolve or degrade upon contact with a fluid in the borehole. The fluid can be water-based or oil-based. By dissolving or degrading upon contact with the fluid, the shell 130 can release the sheet 110 into the borehole. Water-soluble or water-degradable polymers can partially dissolve or degrade upon exposure to aqueous-based fluids under downhole conditions and can result in the shell 130 losing at least a portion of its mechanical strength, which can allow for easier disintegration of the shell 130 and the subsequent release of the sheet 110. Oil-soluble or oil-degradable polymers can partially dissolve or degrade upon exposure to oil-based fluids under downhole conditions and can result in the shell 130 losing at least a portion of its mechanical strength, which can allow for easier disintegration of the shell 130 and the subsequent release of the sheet 110.

In some embodiments, a timed release of the sheet 110 into the borehole can be accomplished by controlling the dissolution or degradation rate of the shell 130. The dissolution rate of the shell 130 can be controlled by providing a shell 130 with a thickness and composition that can dissolve or degrade at about a known or variable rate upon exposure to expected downhole conditions. For example, multiple layers of different materials can be co-extruded as a film such that a water-insoluble layer can be sandwiched between two water-soluble or water-degradable layers. The water-soluble or water-degradable layer exposed to aqueous fluids under downhole conditions can disintegrate, which can expose a weaker layer that is water-insoluble. Such an exposed water-insoluble layer can lose a portion of its mechanical strength under borehole conditions. For example, in the borehole, the water-insoluble layer can be exposed to borehole temperatures equal to or greater than its melting point temperature. Small punctures in this water-insoluble layer can allow water to enter the shell 130 and break down the inner water-soluble or water-degradable layer that can result in further weakening of the shell 130, which can lead to rupture and release of the sheet 110. In other embodiments, the water-insoluble layer can be the innermost layer of which the water-soluble or water-degradable layers are disposed on the exterior. In other embodiments, the shell 130 can include components that are less soluble in fluids at cooler temperatures than in fluids at warmer temperatures. Non-limiting examples of such materials include polyvinyl acetate. As used throughout the disclosure, cooler temperatures refer to temperatures between about 50° F. and about 150° F., and warmer temperatures refer to temperatures between about 151° F. and about 450° F. For example, completely hydrolyzed polyvinyl acetate can be substantially less soluble in cooler water than in warmer water. In other embodiments, the shell 130 can be designed in such a way to dissolve or melt only at downhole temperatures. For example, ethylene copolymers with propylene, butene or 1-hexene can be designed to melt at temperatures from about 100° F. to about 250° F. In some embodiments, the dissolution or degradation rate of the water-soluble or water-degradable polymer can be controlled by adding a water-soluble plasticizer such as glycerin, a salt such as sodium chloride and potassium chloride, or both.

The unfoldable device 100 in the folded (or compressed) state can have a three dimensional geometry suitable for being pumped into the borehole in combination with a drilling fluid. FIG. 2 shows an example unfoldable device 100 in the folded (or compressed) state having a substantially spherical geometry. The unfoldable device 100 in the folded (or compressed) state can be substantially spherical such that friction, rotation, and drag can be reduced while the unfoldable device 100 is being pumped into the borehole in combination with the drilling fluid. A spherical shape is structurally stable than other shapes, and is more likely to remain in its intact form during drilling fluid circulation. Nonetheless, one skilled in the art would recognize that the unfoldable device 100 in the folded (or compressed) state need not have a spherical geometry. The unfoldable device 100 in the folded (or compressed) state can have an ellipsoidal geometry. The unfoldable device 100 in the folded (or compressed) state can have a non-spherical geometry. Non-limiting examples of non-spherical geometries of the unfoldable device 100 in the folded (or compressed) state include cylindrical, conical, and polyhedral geometries. In addition, the unfoldable device 100 in the folded (or compressed) state can have a truncated geometry of spheres, ellipsoids, cylinders, cones, or polyhedrons. The unfoldable device 100 can exist in a combination of any of the above intact or truncated geometries. The diameter (or major dimension) of the unfoldable device 100 shown in FIG. 2 can vary between about 0.1 cm and about 10 cm, alternately between about 0.15 cm and about 0.35 cm, alternately between about 0.5 cm and about 5 cm, and alternately between about 1.5 cm and about 3.5 cm. While pumping, the unfoldable device 100 in the folded (or compressed) state can experience some degree of deformation due to drilling fluid pressure; however, the shell 130 is mechanically resilient enough to withstand mechanical rupture during pumping and circulation. One skilled in the art would recognize that the thickness of the shell 130 can vary depending on parameters such as the degree of restoring force of the polymeric sheet 110 and the backbone 120, dissolution or degradation timing, chemical composition of the drilling fluid, pH, hydrophilicity, hydrophobicity, pressure, and temperature.

In an example embodiment of the method, a sheet 110 is prepared. The sheet 110 can be reinforced with the backbone 120. The backbone 120 can be attached to or molded into the sheet 110 via 3D. The sheet 110 is in the unfolded state and the backbone 120 is in the original state. The sheet 110 either with or without the backbone 120 is compressed by passing the polymeric sheet 110 into a tubing while adding an uncured form of the dissolvable or degradable polymer. The interior of the tubing can include a material such as polytetrafluoroethylene (PTFE) that has sparse friction. At least one of mechanical force, heat, and vacuum suction can be applied to the interior of the tubing to compress the sheet 110 while curing the dissolvable or degradable polymer forming the substantially spherical unfoldable device 100 in the folded (or compressed) state. In some embodiments, a curing agent can be added to the uncured form of the dissolvable or degradable polymer to cure and harden the dissolvable or degradable polymer. After compression and curing, the unfoldable device 100 in the folded (or compressed) state is prepared for deployment.

In some embodiments, a plurality of polymeric sheets 110 is prepared. The plurality of sheets 110 can be reinforced with a plurality of backbones 120. The plurality of sheets 110 is in the unfolded state and the plurality of backbones 120 is in the original state. The plurality of sheets 110 either with or without the plurality of backbones 120 is compressed in a serial manner by passing a sheet 110 one at a time into the tubing while adding an uncured form of the dissolvable or degradable polymer. At least one of mechanical force, heat, and vacuum suction can be applied to the interior of the tubing to compress the series of sheets 110 while curing the degradable polymer forming a series of substantially spherical beads connected to one another in a serial manner. Each bead corresponds to an individual unfoldable device 100 in the folded (or compressed) state. In some embodiments, a curing agent can be added to the uncured form of the dissolvable or degradable polymer 130 to cure and harden the dissolvable or degradable polymer. After compression and curing, the interconnected series of substantially spherical beads are cut to form the unfoldable device 100 in the folded (or compressed) state, which is prepared for deployment.

Figure 3:
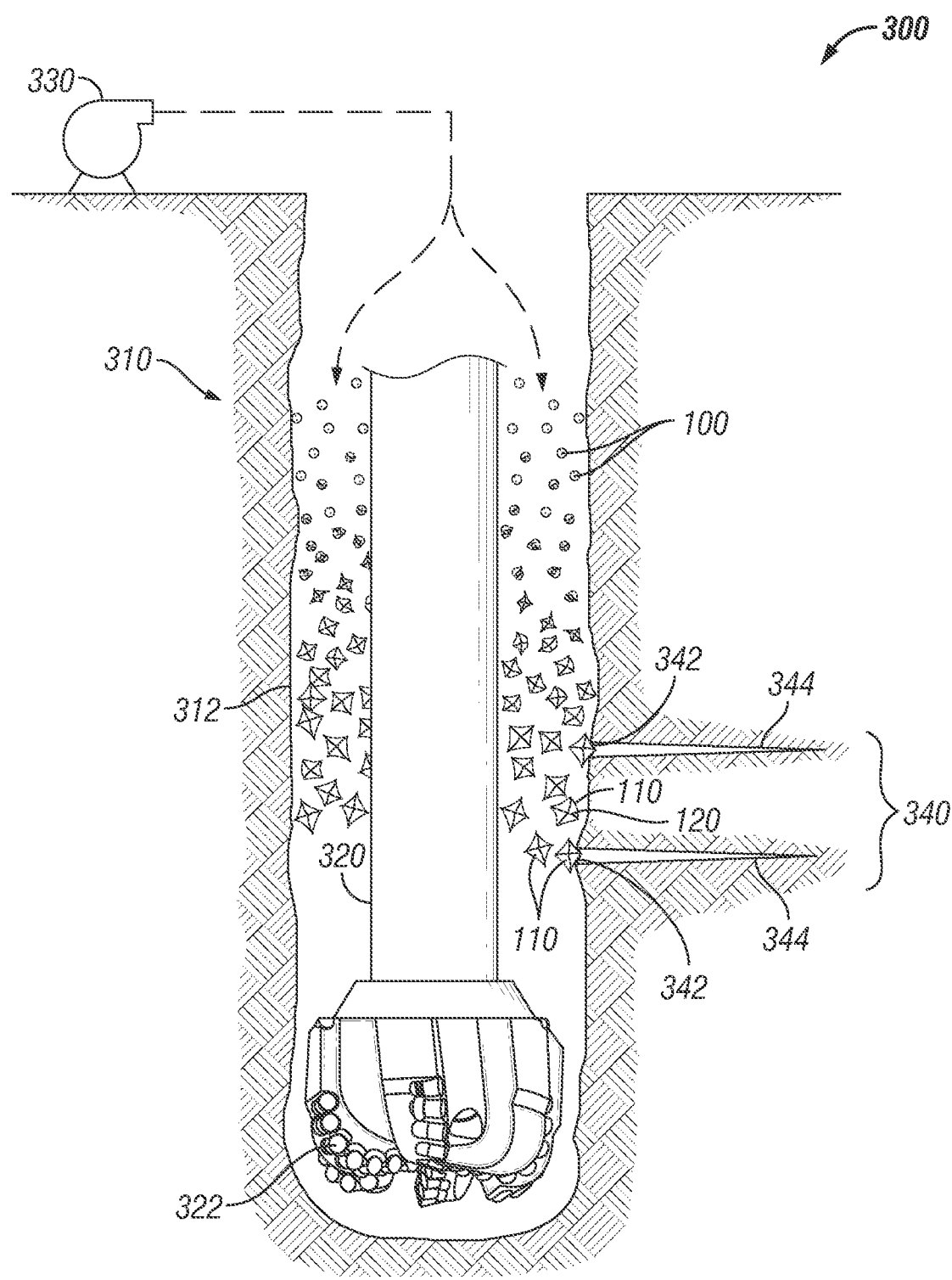
FIG. 3 is a sectional view of introducing the unfoldable device into a borehole of a subterranean formation, according to an embodiment of the disclosure.
Figure 4:
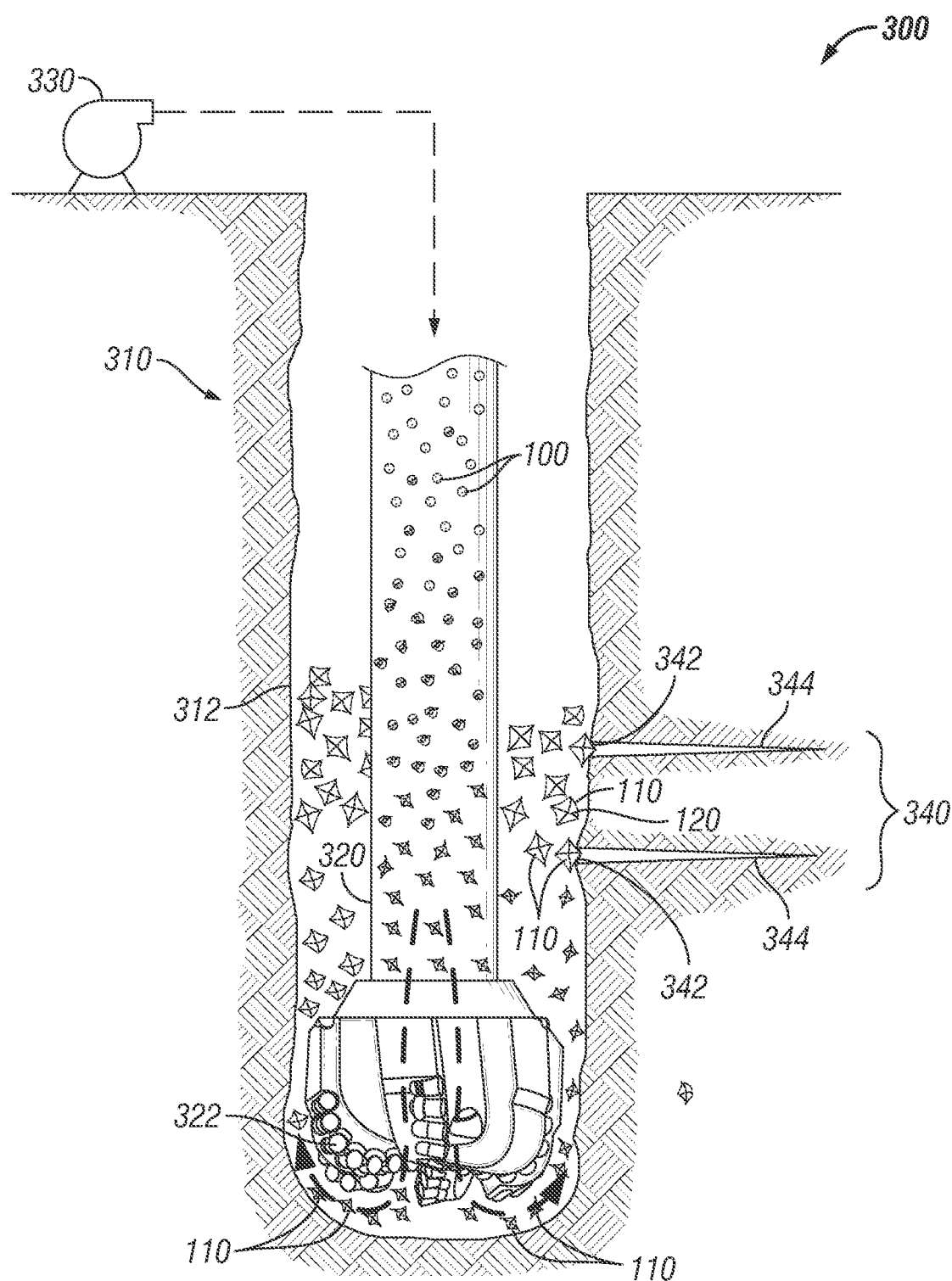
FIG. 4 is a sectional view of introducing the unfoldable device into a borehole of a subterranean formation, according to an embodiment of the disclosure.

FIG. 3 shows a sectional view of introducing the unfoldable device 100 in the folded (or compressed) state into a borehole 310 of a subterranean formation 300, according to an embodiment of the disclosure. FIG. 4 shows a sectional view of introducing the unfoldable device 100 in the folded (or compressed) state into a borehole 310 of a subterranean formation 300, according to an embodiment of the disclosure. The borehole 310 extends downwards from a surface of the earth, which can be a ground level surface or a subsea surface. A drill string 320 extends into the borehole 310. The borehole 310 can be an uncased opening. In other embodiments, the borehole 310 can be part of an outer tubular member, such as a casing. The drill string 320 includes downhole tools and equipment that are secured in line with joints of the drill string 320. The drill string 320 can have a bottom hole assembly including a drill bit 322. The drill bit 322 rotates to create the borehole 310.

The unfoldable device 100 in the folded (or compressed) state can be mixed with or added to a drilling fluid or a base fluid. The unfoldable device 100 in the folded (or compressed) state can be added to a base fluid and stored prior to use, for example, as a mixture, dispersion or suspension. The unfoldable device 100 in the folded (or compressed) state can be dispersed or suspended in a suitable carrier fluid prior to being added to a drilling fluid or a base fluid. The unfoldable device 100 in the folded (or compressed) state can be added to mixing tanks prior to circulation, or can be added while drilling ahead. The unfoldable device 100 in the folded (or compressed) state can be added as a single addition prior to drilling, or can be added continuously or intermittently throughout the operation. The unfoldable device 100 in the folded (or compressed) state can be added in increments while drilling ahead or in heavy sweeps and pill additions. The unfoldable device 100 in the folded (or compressed) state can be continually mixed into the drilling fluid. The rate and route of addition can be adjusted throughout the drilling procedure to account for changes anticipated or encountered throughout the procedure. For example, an initial volume of the unfoldable device 100 in the folded (or compressed) state is added to the drilling fluid or base fluid prior to drilling and additional volumes can be added throughout the drilling operation, as needed. The concentration of the unfoldable device 100 in the folded (or compressed) state in the drilling fluid can be adjusted throughout the procedure to account for sudden changes in lost circulation that can be experienced. In some embodiments, the unfoldable device 100 in the folded (or compressed) state can be mixed directly into the active circulating drilling fluid at a rate of about 0.01 to about 100 kilograms per minute while drilling ahead. Alternatively, the unfoldable device 100 in the folded (or compressed) state can be mixed into a holding tank or premix tank containing the drilling fluid or base fluid, for example, in a concentration range from about 0.01 to about 500 kilograms per cubic meter.

The drilling fluid or base fluid can include any drilling fluid that can be used in a hydrocarbon well operation for controlling lost circulation. Non-limiting examples of the drilling fluid include oil-based fluids, aqueous-based fluids, aqueous-miscible fluids, water-in-oil emulsions, and oil-in-water emulsions. Non-limiting example oil-based fluids include alkanes, olefins, aromatic organic compounds, cyclic alkanes, paraffins, diesel fluids, mineral oils, and desulfurized hydrogenated kerosenes. Non-limiting example aqueous-based fluids include fresh water, saltwater (that is, water containing one or more dissolved salts), brine (that is, saturated salt water), and seawater. Non-limiting example aqueous-miscible fluids include alcohols (for example, methanol, ethanol, n-propanol, isopropanol, n-butanol, sec-butanol, isobutanol, and t-butanol), glycerins, glycols (for example, polyglycols, propylene glycol, and ethylene glycol), polyglycol amines, polyols, any derivative of the same, any in combination with salts (for example, sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), and any in combination with an aqueous-based fluid. Non-limiting examples of water-in-oil emulsions, known as invert emulsions, can have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the fluid, where the amount can range from any lower limit to any upper limit.

Referring to FIG. 3, the unfoldable device 100 in the folded (or compressed) state is introduced into the borehole 310 along with the drilling fluid via a pump 330. As the unfoldable device 100 approaches the target lost circulation zone 340 downhole, the shell 130 at least partially dissolves or degrades upon exposure to the drilling fluid. The shell 130 releases the sheet 110 in its folded (or compressed) state with the backbone 120 in the deformed state. As the sheet 110 is released from the shell 130, the backbone 120 transitions to its original state due to the shape-memory material having a tendency to return to its original state. This is triggered by, for example, elastic force, heat, electric force, magnetic force, light, chemical absorption, or swelling. The shape-memory transition allows the sheet 110 to transition to its unfolded state.

In other embodiments, the unfoldable device 100 in the folded (or compressed) state without a backbone 120 is introduced into the borehole 310 along with the drilling fluid via the pump 330. As the unfoldable device 100 approaches the target lost circulation zone 340 downhole, the shell 130 at least partially dissolves or degrades upon exposure to the drilling fluid. The shell 130 releases the sheet 110 in its folded (or compressed) state. As the sheet 110 is released from the shell 130, the sheet 110 transitions to its unfolded state due to the shape-memory material having a tendency to return to its original state. This is triggered by, for example, elastic force, heat, electric force, magnetic force, light, chemical absorption, or swelling.

Referring to FIG. 4, the unfoldable device 100 in the folded (or compressed) state is introduced into the drill string 320 along with the drilling fluid via a pump 330. The unfoldable device 100 exits the drill string 320 through a conduit (not shown) located at or adjacent to the drill bit 322 and enters the bottom portion of the borehole 310. In some embodiments, as the unfoldable device 100, in the borehole 310, approaches the target lost circulation zone 340 downhole, the shell 130 at least partially dissolves or degrades upon exposure to the drilling fluid. In some embodiments, as the unfoldable device 100 proceeds downward through the drill string 320, the shell 130 at least partially dissolves or degrades upon exposure to the drilling fluid. In the borehole 310, the shell 130 releases the sheet 110 in its folded (or compressed) state with the backbone 120 in the deformed state. As the sheet 110 is released from the shell 130, the backbone 120 transitions to its original state due to the shape-memory material having a tendency to return to its original state. This is triggered by, for example, elastic force, heat, electric force, magnetic force, light, chemical absorption, or swelling. The shape-memory transition allows the sheet 110 to transition to its unfolded state.

In other embodiments, the unfoldable device 100 in the folded (or compressed) state without a backbone 120 is introduced into the drill string 320 along with the drilling fluid via the pump 330. The unfoldable device 100 exits the drill string 320 through the conduit (not shown) located at or adjacent to the drill bit 322 and enters the bottom portion of the borehole 310. In some embodiments, in the borehole 310, as the unfoldable device 100 approaches the target lost circulation zone 340 downhole, the shell 130 at least partially dissolves or degrades upon exposure to the drilling fluid. In some embodiments, as the unfoldable device 100 proceeds downward through the drill string 320, the shell 130 at least partially dissolves or degrades upon exposure to the drilling fluid. In the borehole 310, the shell 130 releases the sheet 110 in its folded (or compressed) state. As the sheet 110 is released from the shell 130, the sheet 110 transitions to its unfolded state due to the shape-memory material having a tendency to return to its original state. This is triggered by, for example, elastic force, heat, electric force, magnetic force, light, chemical absorption, or swelling.

Referring back to FIGS. 3 and 4, in the unfolded state, the sheet 110 accumulates on the borehole wall 312 located at the interface of the borehole 310 and the macrochannel 344 of the target lost circulation zone 340, that is, the entrance 342 to the macrochannel 344 of the target lost circulation zone 340. A hydraulic pressure differential is created by the pumping of the drilling fluid and the loss occurring at a lost circulation zone. The hydraulic pressure differential can physically drive or drag the unfolded sheet 110 to the borehole wall 312 to at least partially cover the entrance 342. In some embodiments, an initial partial fluid loss can occur. However, this initial partial fluid loss can create enough hydraulic pressure differential to physically drive or drag the unfolded sheet 110 to the borehole wall 312 to at least partially cover the entrance 342 to the macrochannel 344 of the target lost circulation zone 340. In some embodiments, the accumulation is maintained as long as the hydraulic pressure differential exists due to fluid loss (such as seepage loss or partial loss) occurring in other locations in the borehole 310. In addition, the sheet 110 can include abrasive materials on the surface to enhance friction to the borehole wall 312 to maintain the accumulation. In some embodiments, a plurality of unfolded sheets 110 can accumulate on the borehole wall 312 at least partially covering the entrance 342 to the macrochannel 344 of the lost circulation zone 340. These sheets 110 can stack against one another providing multiple layers of fluid loss prevention. In some embodiments, a single unfolded sheet 110 can cover a plurality of entrances 342.

In some embodiments, the unfolded sheet 110 is configured to at least partially cover the entrance 342 to the macrochannel 344 of the target lost circulation zone 340 that is responsible for a severe loss or total loss. While the accumulation of the unfolded sheet 110 to the borehole wall 312 at the entrance 342 prevents the drilling fluid from entering the macrochannel 344 of the target lost circulation zone 340 responsible for severe loss or total loss, other conventional means of controlling loss circulation can be incorporated to control other lost circulation zones responsible for seepage or moderate losses. Other convention means can include spotting of LCM pills, plugging pores, and creation of a mud cake.

In an example embodiment of the method, the unfoldable device 100 having the shell 130 encapsulating the sheet 110 in its folded (or compressed) state and the backbone 120 in its deformed state is introduced into the borehole 310 in conjunction with a drilling fluid. In some embodiments, the unfoldable device 100 can be introduced directly into the borehole 310. In some embodiments, the unfoldable device 100 can be introduced into the borehole 310 through a drill string 320. The shell 130 degrades in the borehole 310 as the unfoldable device 100 approaches the target lost circulation zone 340. The degradation allows the shell 130 to release the sheet 110. The sheet 110 transitions to the unfolded state and the backbone 120 transitions to the original state. The sheet 110 in the unfolded state accumulates on the borehole wall 312 at least partially covering the entrance 342 to the macrochannel 344 of the target lost circulation zone 340.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A method for controlling lost circulation in a target lost circulation zone in a borehole, the method comprising the step of:
   introducing an unfoldable device in a compressed state and a drilling fluid into the borehole, where the unfoldable device comprises:
      a sheet, the sheet having an unfolded state and a folded state;
      a backbone, the backbone reinforcing the sheet, the backbone comprising a shape-memory material having an original state corresponding to the unfolded state of the sheet and a deformed state corresponding to the folded state of the sheet; and
      a shell, the shell encapsulating the sheet in the folded state and the backbone in the deformed state, the shell comprising a degradable polymer,
   where the shell degrades in the borehole such that the sheet is released, and
   where the sheet transitions to the unfolded state and the backbone transitions to the original state such that the sheet accumulates on a borehole wall at least partially covering an entrance to a macrochannel of the target lost circulation zone.

2. The method of claim 1, where the sheet comprises a polymer selected from the group consisting of: thermoplastic elastomers, diene-based polymers, monoolefin-based polymers, ethylene-based polymers, 1-hexene-based polymers, polyurethanes, polyesters, polyethers, fluoropolymers, styrene-butadiene random copolymers, styrene-butadiene block copolymers, styrene-butadiene-styrene block copolymers, hydrogenated styrene-butadiene rubber, and combinations of the same.

3. The method of claim 1, where the shell degrades at a temperature greater than 100° F.

4. The method of claim 1, where the unfoldable device in the compressed state has a substantially spherical geometry.

5. The method of claim 4, where the unfoldable device in the compressed state has a substantially spherical geometry has a diameter ranging from 1.5 to 3.5 centimeters.

6. The method of claim 1, where the unfoldable device in the compressed state has a geometry selected from the group consisting of: ellipsoidal, cylindrical, conical, polyhedral, truncated geometries of the same, and combinations of the same.

7. The method of claim 6, where the unfoldable device in the compressed state has a major dimension ranging from 1.5 to 3.5 centimeters.

8. The method of claim 1, where the shape-memory material includes a material selected from the group consisting of: shape-memory polymers, shape-memory alloys, elastic materials, and combinations of the same.

9. The method of claim 1, where the shape-memory material includes a viscoelastic polyurethane foam.

10. The method of claim 1, where the backbone is attached to the sheet via 3D printing.

11. An altered drilling fluid for controlling lost circulation in a target lost circulation zone in a borehole, the altered drilling fluid comprising:
   a drilling fluid; and
   an unfoldable device dispersed in the drilling fluid, the unfoldable device comprising:
      a sheet, the sheet having an unfolded state and a folded state;
      a backbone, the backbone reinforcing the sheet, the backbone comprising a shape-memory material having an original state corresponding to the unfolded state of the sheet and a deformed state corresponding to the folded state of the sheet; and
      a shell, the shell operable to encapsulate the sheet in the folded state and the backbone in the deformed state such that the unfoldable device is in a compressed state.

12. The altered drilling fluid of claim 11, where the sheet comprises a polymer selected from the group consisting of: thermoplastic elastomers, diene-based polymers, monoolefin-based polymers, ethylene-based polymers, 1-hexene-based polymers, polyurethanes, polyesters, polyethers, fluoropolymers, styrene-butadiene random copolymers, styrene-butadiene block copolymers, styrene-butadiene-styrene block copolymers, hydrogenated styrene-butadiene rubber, and combinations of the same.

13. The altered drilling fluid of claim 11, where the shell comprises a degradable polymer configured to degrade in the borehole upon contact with the drilling fluid such that the sheet transitions to the unfolded state and the backbone transitions to the original state.

14. The altered drilling fluid of 13, where the degradable polymer is configured to degrade in the borehole at a temperature greater than 100° F.

15. The altered drilling fluid of claim 14, where the sheet in the unfolded state is configured to accumulate on a borehole wall at least partially covering an entrance to a macrochannel of the target lost circulation zone.

16. The altered drilling fluid of claim 11, where the unfoldable device in the compressed state has a substantially spherical geometry.

17. The altered drilling fluid of claim 16, where the unfoldable device in the compressed state has a diameter ranging from 1.5 to 3.5 centimeters.

18. The altered drilling fluid of claim 11, where the unfoldable device in the compressed state has a geometry selected from the group consisting of: ellipsoidal, cylindrical, conical, polyhedral, truncated geometries of the same, and combinations of the same.

19. The altered drilling fluid of claim 18, where the unfoldable device in the compressed state has a major dimension ranging from 1.5 to 3.5 centimeters.

20. The altered drilling fluid of claim 11, where the shape-memory material includes a material selected from the group consisting of: shape-memory polymers, shape-memory alloys, elastic materials, and combinations of the same.

21. The altered drilling fluid of claim 11, where the shape-memory material includes a viscoelastic polyurethane foam.

\* \* \* \* \*